United States Patent

Gilbert et al.

[15] 3,666,670
[45] May 30, 1972

[54] PULVERULENT DRAIN CLEANING COMPOSITION

[72] Inventors: Daniel Eugene Gilbert, Derby; Larry Ralph Nelson; Charles Edwin Sturgeon, both of Wichita; Robert Keith Thom, Derby, all of Kans.

[73] Assignee: Vulcan Materials Company, Birmingham, Ala.

[22] Filed: Aug. 1, 1969

[21] Appl. No.: 846,968

[52] U.S. Cl. ............................ 252/160, 252/158, 252/165, 252/259.5, 252/383, 252/449
[51] Int. Cl. .................................. C11d 3/14, B01j 11/60
[58] Field of Search ............... 44/3; 252/157, 188.3, 156, 252/158, 165, 163, 159, 160, 192, 190, 259.5, 449, 454, 457, 455, 194; 210/502, 506

[56] References Cited

UNITED STATES PATENTS

| | | | |
|---|---|---|---|
| 860,768 | 7/1907 | Stiefel | 252/158 |
| 2,032,174 | 2/1936 | Johnson | 134/39 X |
| 2,913,418 | 11/1959 | Sohngen et al. | 252/163 |
| 3,060,125 | 10/1962 | Sims | 252/153 |

FOREIGN PATENTS OR APPLICATIONS

| | | | |
|---|---|---|---|
| 679,056 | 1/1964 | Canada | 134/2 |

*Primary Examiner*—Leon D. Rosdol
*Assistant Examiner*—Arnold I. Rady
*Attorney*—Burns, Doane, Swecker & Mathis

[57] ABSTRACT

A free flowing, pulverulent drain cleaning composition is made by mixing an alkali metal hydroxide such as caustic soda; a halogenated lower aliphatic hydrocarbon such as perchloroethylene, methylene chloride or methylchloroform; particulate silica; and a wetting agent.

7 Claims, No Drawings

PULVERULENT DRAIN CLEANING COMPOSITION

BACKGROUND OF INVENTION

This invention relates to compositions useful in removing troublesome deposits in drain systems and the like and, more particularly, is directed to a composition effective as a household drain cleaner.

A wide variety of materials, singly and in combination, are typically responsible for the clogging of household and industrial waste drain systems. These materials vary, but mainly they comprise animal fats and tissue, vegetable parts or other cellulose materials, hair, oils, various greases and other miscellaneous organic and inorganic matter. These materials tend to accumulate in restricted areas of the plumbing systems to such a degree that flow therethrough may be seriously impeded or blocked. Because of the diversity of the materials responsible for such blockage the formulation of a more or less universally effective and easy to handle cleaning composition has been a problem for which the prior art has not found a fully satisfactory solution, though many efforts have been made in this direction.

For instance, U.S. Pat. No. 1,618,376 discloses a composition useful in opening clogged drains and traps which comprises a caustic material such as sodium or potassium hydroxide, preferably in combination with sodium carbonate; and a substance capable of generating gas when heated in situ, e.g., paradichlorobenzene. The caustic material saponifies fat and otherwise attacks animal and vegetable matter whereas the gas evolved in this system is said to assist in the cleaning process through ebullition.

Other compositions previously proposed in U.S. Pat. Nos. 1,534,167 and 1,814,741 incorporates silicon or aluminum and a strong alkali. These ingredients react with water when poured into a plugged drain and generate heat and hydrogen which assists in the removal of obstructing accumulations through ebullition. Generating hydrogen in a plumbing system is, however, not generally desirable because of the explosive nature of hydrogen.

Some compositions currently in use utilize anhydrous flaked sodium hydroxide as the primary ingredient. Such a sodium hydroxide based composition in the dry form is introduced into the system being treated to which a controlled amount of water is subsequently added. The exothermic reaction between the caustic and the added water creates a considerable increase in temperature which assists the strongly alkaline solution in attacking material such as grease, cellulose and hair. However, such anhydrous alkali is hazardous to handle, easily loses its free flowing character if not stored out of contact with atmospheric moisture, and otherwise leaves much to be desired.

Other known drain cleaning compositions currently in use utilize a liquid chlorinated aliphatic hydrocarbon as an essential ingredient. The liquid is introduced into the system to be treated and because of its higher density it seeks the lowest level in the drain system. This is advantageous in that it places the solvent at the place most likely to contain the obstructing accumulations. However, the chlorinated hydrocarbon is ineffective in dissolving or dispersing materials such as vegetable fibers and hair.

The compositions of this invention overcomes the various disadvantages encountered in the prior art and improves the unplugging of plugged household drains or similar systems. The invention provides a free flowing, dry, substantially non-deliquescent drain cleaning composition which effectively and safely dissolves, disperses and removes accumulations of various kinds of the type encountered in waste drain systems.

SUMMARY OF INVENTION

The present, pulverulent drain cleaning composition comprises a mixture of an alkali metal hydroxide in finely divided form, a halogenated or chlorinated lower aliphatic hydrocarbon solvent, finely powdered or fumed silica and a wetting agent; the silica being present in sufficient proportion relative to the liquid solvent to give a dry, free flowing powder. The composition is made by first mixing the particulate silica and the halogenated liquid solvent such that the resultant combination of the two ingredients is in a free flowing form and then adding thereto and blending therewith the powdered alkali metal hydroxide and the wetting agent.

It is a primary object of this invention to provide a novel drain cleaning composition which is easy as well as safe to store and to handle.

It is a more specific object to provide a superior drain cleaning composition which utilizes the combined effectiveness of an alkali metal hydroxide and a halogenated hydrocarbon solvent but is nevertheless a dry, substantially non-deliquescent, easy to use powder.

Additional objects and features of the invention, including the manner of making and using it, will become apparent from the following detailed, illustrative description thereof. In reading this description, it should be understood that all quantities and proportions of materials are expressed on a weight basis unless indicated otherwise.

GENERAL DESCRIPTION

Typically a composition made according to the instant invention comprises 15 to 80 percent, preferably 40 to 60 percent, of an alkali metal hydroxide; 20 to 85 percent, preferably 40 to 55 percent, of a halogenated hydrocarbon solvent; 1 to 15 percent, preferably 4 to 12 percent, of a colloidal or finely divided silica; and, if desired, a small amount, e.g., 0.5 to 5 percent, preferably 1 to 2 percent of a wetting agent such as a sodium alkyl sulphonate.

The alkali metal hydroxide serves many purposes in the composition. In one respect, when it is introduced into a drain system to be treated it reacts with the water generating heat and attacking, dissolving and dispersing matter which has accumulated in an undesirable location of the system. The hot strong alkali solution so formed is especially useful in attacking grease, cellulose materials, hair and some animal tissue. The particle size of the dry granulated, substantially anhydrous alkali metal hydroxide used in this invention may range from about 200 mesh to about 15 mesh depending on the consistency of the desired final composition. Typical examples of suitable alkali metal hydroxides include the hydroxides of lithium, sodium, potassium, rubidium and cesium. Due to economics and availability, either sodium or potassium hydroxide are generally preferred.

The halogenated lower aliphatic hydrocarbon solvent, which serves to dissolve and disperse organic matter such as greases, resins and waxes, is preferably a halogenated alkane or alkene which contains from one to four carbon atoms and from two to six or more halogen atoms per molecule. Solvents within the above description include methylene chloride, dichloroethylene, trichloroethylene, tetrachloroethylene (perchloroethylene), methylchloroform, pentachloroethane, etc., as well as the corresponding brominated and fluorinated compounds which are liquid at ambient temperature, e.g., between 15° and 25° C. However, chlorinated hydrocarbons containing one to two carbon atoms and two to four chlorine atoms, e.g., methylene chloride, methylchloroform and especially perchloroethylene, are particularly preferred. Carbon tetrachloride and some of the fluoro or mixed fluorochloro compounds are useful but less desirable for general use because of their higher toxicity or volatility while some of the other solvents are unnecessarily expensive.

The finely divided adsorbent silica, preferably in anhydrous form, is used in the composition to maintain it in a free flowing granulated state. A sufficient amount of the silica is added with the halogenated solvent such that the resulting mixture is dry and free flowing. Apparently the halogenated hydrocarbon solvent is adsorbed onto the surface of the finely divided silica which itself has a very large surface area and is capable of adsorbing such compounds thereon. A form of finely divided silica which has been found to be particularly useful is a fumed silicon dioxide prepared from the high temperature oxidation of silicon tetrachloride. It is commercially available, for instance, under the trademark "Cab-O-Sil" from the Cabot Corporation of Boston, Massachusetts. The particles of such silica preferably are of fine enough size to pass through a 325-mesh sieve and more preferably may vary in diameter from about 50 to about 500 angstroms with surface areas from about 50 $m^2/g$ to about 400 $m^2/g$. The use of fumed silica having a particle size within the range of from about 70 to 120 angstroms and a surface area in the range from about 175 to 350 $m^2/g$ is particularly preferred.

A wetting agent is preferably added for the customary purpose of reducing the surface tension of the components in the mixture when contacted with water to assist their mutual compatibility. Typically, alkali metal salts of $C_6$—$C_{15}$ alkyl benzene sulphonic acids are convenient to use in this composition. A suitable example of this is sodium dodecyl benzene sulphonate. However, other classes of wetting agents or surfactants which are stable and effective in the presence of strong alkali and which are available in dry powder form may similarly be used. They may be anionic, cationic or non-ionic. For instance, solid ethoxylated alkyl phenols such as ethoxylated nonyl phenol, sulfates of straight chain alcohols such as sodium lauryl sulfate, quaternary ammonium halides such as benzethonium chloride, as well as ethoxylated alkyl phenols such as ethoxylated nonyl phenol or other oil-soluble compounds (such as the higher fatty acids, alcohols, amides or amines) which have been ethoxylated to impart to them a hydrophilic character are usable. It should be understood that the specific nature or even the presence of a surfactant is not a particularly critical feature of the present invention.

After preparing the composition by first mixing together the fumed silica and the halogenated hydrocarbon solvent in a mixer or blender in the proper proportions to yield a free flowing powder, the strong alkali metal hydroxide and the wetting agent are then added and blended therewith in such proportions and in such a manner so as to preserve the free flowing dry nature of the composition. The composition when properly prepared should not show any settling, segregation of ingredients or caking even when it is stored for several months. The composition will not burn or support combustion.

The composition can be used by introducing it into the affected drain system at a convenient location such as a sink drain opening. The amount introduced into the drain system will of course be dependent upon the severity of the restriction therein. After the introduction of a certain quantity of the drain cleaning composition water is also added in a limited quantity, e.g., about 0.5 to 5 parts of water per part of the alkali metal hydroxide present in the composition which was introduced into the system.

When the granular alkali metal hydroxide in the composition is thus contacted by the added water it dissolves therein with a resultant increase in temperature due to the heat of solution. The resulting hot, strong basic solution acts on the deposits which have accumulated in the drain and the added water also releases the halogenated hydrocarbon solvent from the silica on which it has been adsorbed. Having a greater density the solvent sinks and collects below the aqueous layer where it begins dissolving and dispersing the organic matter which may have accumulated in the drain. The wetting agent also dissolves in the water and serves to enhance the action of the primary ingredients on the deposits.

The composition so mixed with water is allowed to remain in the system being treated for a period of 5 to 45 minutes, e.g., 15 to 30 minutes, in order to completely exploit the action of the active ingredients on the deposits. At the end of this period water at a high flow rate is introduced into the system to flush the residual cleaning composition from the system along with the remaining deposits which have been dissolved or loosened from the treated zone. When flushed as described, no residue from the treating mixture remains in the system.

The efficiency with which the composition effects removal of accumulated deposits depends of course upon the nature, quantity and fixation of the offending deposits. In severe cases the treatment may have to be repeated until complete unclogging has been effected. However, it has been found that the present composition, with its novel combination and form of ingredients, is more effective and efficient than any other known to be in use for household drain cleaning.

Following this general description of the nature, scope and use of the invention, the following examples are offered to illustrate it further, without, however, being in any way limiting.

EXAMPLE 1

A drain cleaning composition is prepared by mixing 50 parts tetrachloroethylene and 7 parts fumed silica (300 mesh Cab-O-Sil) having a particle size in the range from 0.007 to 0.012 microns and a surface area of about 250 $m^2/g$. A dry pulverulent mixture is thus obtained as the solvent is adsorbed on the silica. Thereafter 42 parts of powdered anhydrous caustic soda having a particle size of 60 mesh and 1 part of finely powdered sodium lauryl sulfate are added to the solvent containing silica and blended therewith until a uniform, free flowing granular mixture is formed.

This mixture was tested by first deliberately blocking a drain trap fabricated from glass with about 30 parts human hair, about 100 parts bacon fat, about 20 parts vegetable matter, and allowing the mixture to cool in the system thereby completely obstructing it. The drain was then filled with water to better simulate a completely obstructed sink drain. About 50 parts of the powdered drain cleaning mixture was added, followed by about 50 parts water to flush the cleaner into the water filled line. The cleaner was observed to settle through the water to the top of the obstruction. The caustic soda dissolved with its accompanying heat of solution and the tetrachloroethylene was released as a liquid. The tetrachloroethylene was observed to rapidly penetrate through the obstruction thereby opening a channel through which the caustic solution followed, allowing the obstructing matter to be attacked from both sides and the center. The system was allowed to set 15 minutes during which time the grease was observed to be converting to a soap and the vegetable matter and hair were observed to be dissolving. When additional large quantities of water were added at the end of the 15-minute period, the remainder of the plug was flushed on through the trap thereby re-establishing normal drainage.

EXAMPLE 2

A dry, free flowing composition similar to that described in EXAMPLE 1 is prepared except that the following formula is used:

|  | Parts |
| --- | --- |
| Methylchloroform | 46 |
| Fumed Silica ("Cab-O-Sil") | 6 |
| Sodium Hydroxide, anh. (30/200 mesh) | 46 |
| Sodium lauryl sulfate | 2 |

This composition performs similarly as described in EXAMPLE 1.

EXAMPLE 3

A quantity of anhydrous caustic soda (60 mesh) was placed on a glass plate and a like quantity of the drain cleaner mixture of EXAMPLE 1 was placed on a second glass plate to determine the deliquescence of each. These were simultaneously exposed to air having a relative humidity of 75 percent. After a 5-minute exposure, the caustic soda adsorbed sufficient water such that it no longer flowed when tilted to a 45° angle while the mixture of the invention remained free flowing at the same angle. After twenty minutes exposure, the caustic soda would not flow at a 90° angle while the mixture remained free flowing at 45°. After a two-hour exposure, the surface of the caustic soda was coated with a hard film which required significant force to break. The mixture after two hours, had a damp "fluffy" coating which prevented free flow at 90°. However, slight stirring restored free flowing characteristics. Thus, while the mixture is slightly deliquescent, on a comparative basis it is judged to be only about 10 percent as deliquescent as anhydrous caustic soda.

The invention for which patent protection is sought is particularly pointed out in the appended claims.

We claim:

1. A free flowing, dry, pulverulent drain cleaning composition consisting essentially of:
   a. about 15 to 80 percent of a substantially anhydrous alkali metal hydroxide,
   b. about 20 to 85 percent of a halogenated alkane or alkene hydrocarbon solvent which possesses one to four carbon atoms and two to five halogen atoms per molecule and which is a liquid at a temperature between about 15° C. and about 25° C., and
   c. about 1 to 15 percent of finely divided, adsorbent silica having a surface area in the range between about 50 $m^2/g$ to 400 $m^2/g$ in a quantity such that the liquid solvent is adsorbed thereon and the entire composition is a free flowing powder.

2. A pulverulent drain cleaning composition according to claim 1 consisting essentially of:
   a. about 15 to 80 percent of substantially anhydrous caustic soda or caustic potash,
   b. about 20 to 85 percent of a chlorinated alkane or alkene hydrocarbon possessing from one to two carbon atoms and from two to four chlorine atoms per molecule,
   c. about 1 to 15 percent of finely divided adsorbent silica having a surface area in the range between about 50 $m^2/g$ to 400 $m^2/g$, the amount of said silica being sufficient to adsorb the liquid chlorinated hydrocarbon and produce a substantially dry, free flowing mixture, and
   d. about 0.5 to 5 percent of a wetting agent selected from the group consisting of anionic, cationic, and non-ionic wetting agents.

3. A composition according to claim 2 wherein the alkali is caustic potash.

4. A composition according to claim 2 wherein the chlorinated hydrocarbon is perchloroethylene.

5. A composition according to claim 2 wherein the chlorinated hydrocarbon is trichloroethylene.

6. A composition according to claim 2 wherein the chlorinated hydrocarbon is methylchloroform.

7. A free flowing drain cleaning composition according to claim 2 consisting essentially of:
   a. about 40 to 60 percent of powdered sodium hydroxide,
   b. about 40 to 55 percent of a chlorinated hydrocarbon selected from the group consisting of methylene chloride, trichloroethylene, tetrachloroethylene and methylchloroform,
   c. about 4 to 12 percent of fumed silica possessing a surface area in the range between about 175 and 350 $m^2/g$, and
   d. about 1 to 2 percent of a solid wetting agent selected from the group consisting of sodium alkaryl sulphonates and sodium alkyl sulfates.

* * * * *